(12) United States Patent
Cheng et al.

(10) Patent No.: US 8,658,301 B2
(45) Date of Patent: Feb. 25, 2014

(54) PORTABLE ELECTRONIC DEVICE AND BATTERY EJECTING STRUCTURE THEREOF

(75) Inventors: Wen-Chieh Cheng, New Taipei (TW); Yao-Ting Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 293 days.

(21) Appl. No.: 13/303,200

(22) Filed: Nov. 23, 2011

(65) Prior Publication Data

US 2013/0017698 A1 Jan. 17, 2013

(30) Foreign Application Priority Data

Jul. 15, 2011 (TW) .............................. 100213079 U

(51) Int. Cl.
*H01M 2/10* (2006.01)
*H01R 3/00* (2006.01)

(52) U.S. Cl.
USPC ............... 429/96; 429/97; 429/100; 439/500; 439/504

(58) Field of Classification Search
USPC .............. 429/96, 97, 100, 121; 439/500, 504, 439/756, 159, 152; 361/600, 679, 434
See application file for complete search history.

(56) References Cited

U.S. PATENT DOCUMENTS

| 2003/0085686 A1* | 5/2003 | Haga et al. ..................... 320/112 |
| 2005/0026035 A1* | 2/2005 | Ishikawa et al. .............. 429/100 |
| 2010/0086840 A1* | 4/2010 | Shao .............................. 429/97 |

* cited by examiner

*Primary Examiner* — Raymond Alejandro
(74) *Attorney, Agent, or Firm* — Muncy, Geissler, Olds & Lowe, P.C.

(57) ABSTRACT

A battery ejecting structure is applied to a portable electronic device which comprises a housing and a battery. The battery ejecting structure comprises an ejecting element, a cover, a pushing element and an elastic element. The ejecting element is movably located in the container of the housing; the cover is connected pivotally to the housing and covers the container to be a closed state, and the cover restricts the ejecting element to move via a blocking element; the pushing element is located in the housing, and the fixed member of the ejecting element is connected to the pushing element through the housing. Wherein when the cover is rotated relative to the housing to form an open state, the blocking element disengages from the container, and the pushing element is moved by an elastic restoring force of the elastic element to unlock the battery.

18 Claims, 8 Drawing Sheets

PORTABLE ELECTRONIC DEVICE AND BATTERY EJECTING STRUCTURE THEREOF

BACKGROUND OF THE INVENTION

1. Field of the Invention

The present invention relates to a battery ejecting structure; more particularly, to a battery ejecting structure which uses an elastic restoring force of an elastic element to unlock a locked battery.

2. Description of the Related Art

In a portable electronic device, there is a battery module and a battery module ejecting structure located on the bottom of the portable electronic device, so users may change the battery module via the battery module ejecting structure. However, how to reduce the elements of device and the occupied space is an object which is worth to research.

SUMMARY OF THE INVENTION

It is an object of the present invention to provide a battery ejecting structure which uses an elastic restoring force of an elastic element to unlock a locked battery.

It is another object of the present invention to provide a portable electronic device which uses the battery ejecting structure thereof.

To achieve the abovementioned object, the battery ejecting structure of the present invention is applied to a portable electronic device which comprises a housing and a battery. The battery ejecting structure comprises an ejecting element, a cover, a pushing element and an elastic element. The ejecting element is located in the container of the housing and comprises a fixed member. The cover is connected pivotally to the housing and covers the container to be a closed state. The cover comprises a blocking element for restricting the movement of the ejecting element in a closed state. The pushing element is located in the housing, and the fixed member of the ejecting element is connected to the pushing element through the housing. The pushing element comprises a locking structure for locking the battery while the pushing element is in an initial position. Two ends of the elastic element are connected to the housing and the pushing element respectively. Wherein when the cover is rotated relative to the housing to form an open state, the blocking element disengages from the container, and the pushing element is moved from the initial position to an unlock position by an elastic restoring force of the elastic element to unlock the battery.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

The battery ejecting structure of the present invention is applied to a portable electronic device, and the portable electronic device is a notebook in the following embodiments. However, the present invention is not limited to the application, the portable electronic device can be a mini notebook, a tablet computer, a smartphone, a PDA or other similar electronic devices.

Figure 1:
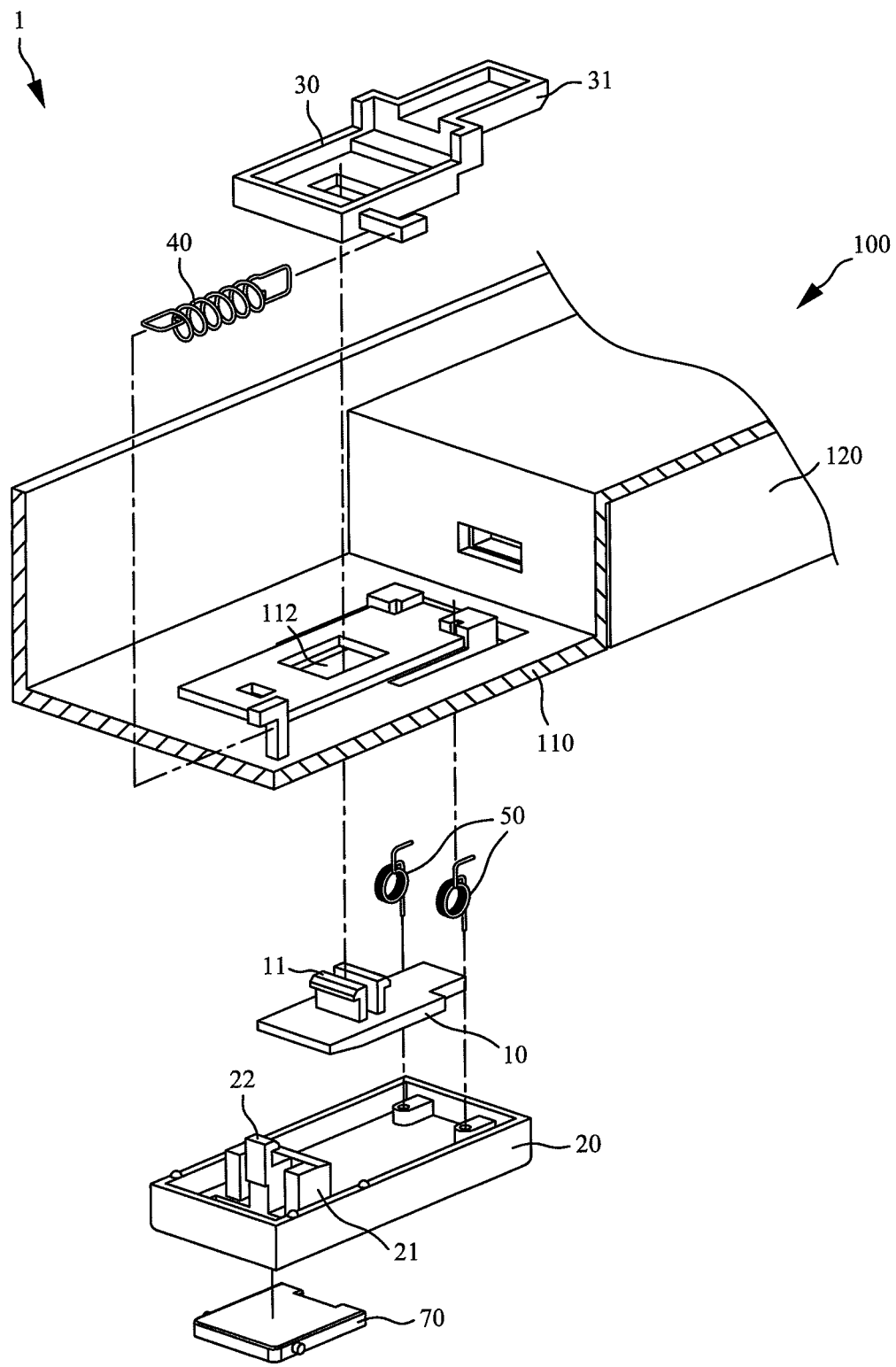
FIG. 1 illustrates an exploded perspective view of the battery ejecting structure according to the first embodiment of the present invention.

Please refer to FIG. 1, which illustrates an exploded perspective view of the battery ejecting structure according to the first embodiment of the present invention. As shown in FIG. 1, the portable electronic device 100 comprises a housing 110 and a battery 120. The housing 110 comprise a container (not shown) located on an external surface of the housing 110, and the container comprises a slide hole 112. The battery 120 is located in the housing 110 next to the container.

In the first embodiment of the present invention, the battery ejecting structure 1 comprises an ejecting element 10, a cover 20, a pushing element 30 and an elastic element 40. The ejecting element 10 is located movably in the container of the housing 110, and the ejecting element 10 comprises a fixed member 11. The fixed member 11 passes through the slide hole 112 of the container and may slide along the slide hole 112, so the ejecting element 10 may move in the container relative to the housing 110.

The cover 20 is connected pivotally to the housing 110 so as to be rotated relative to the housing 110 to present an open state or a closed state. In this embodiment, the cover 20 is connected pivotally to the housing 110 by at least one torsion spring 50 (there are two torsion springs 50 used for connecting), and the cover 20 may automatically return the closed state from the open state by the torsion of the at least one torsion spring 50. However, the present invention is not limited to the design, the torsion spring 50 may be replaced to a pivot element or other similar elements with torsion, and the amount of the torsion spring 50 may be changed according to different design.

The cover 20 comprises a blocking element 21 for restricting the movement of the ejecting element 10 while the cover is in the closed state. The cover 20 further comprises a fastening structure 22 for fastening the cover 20 to the housing 110 while the cover 20 is in the closed state, so as to avoid the cover 20 to disengage from the closed state by crashing or improper force.

The pushing element 30 is located in the housing 110, and the fixed member 11 of the ejecting element 10 is connected to the pushing element 30 through the slide hole 112, so the movement of the ejecting element 10 may bring the pushing element 30 to move together. The pushing element 30 comprises a locking structure 31 used for locking the battery 120.

Two ends of the elastic element 40 are connected to the housing 110 and pushing element 30 respectively, and the pushing element 30 may be driven to move by the elastic restoring force of the elastic element 40.

Figure 2:
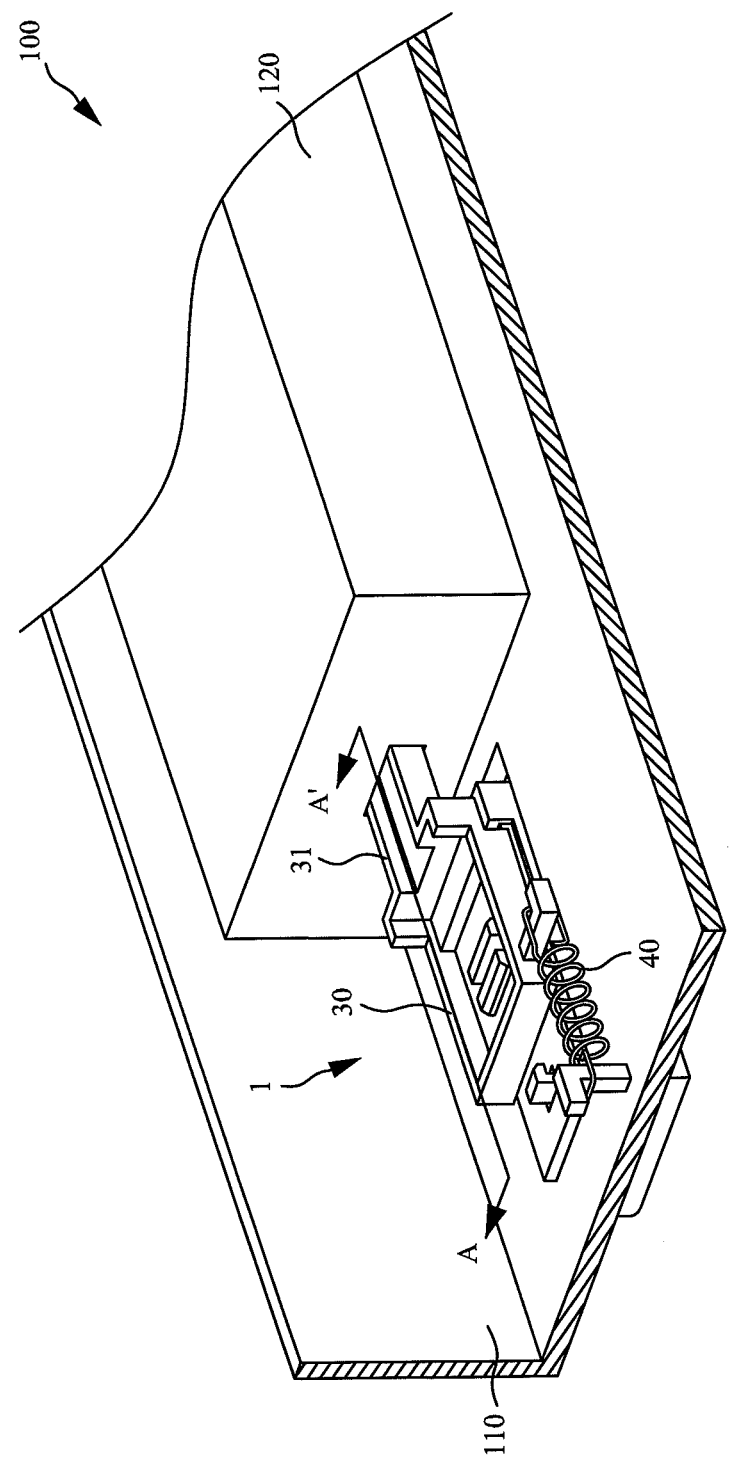
FIG. 2 illustrates a combination schematic drawing of the battery ejecting structure according to the first embodiment of the present invention.

Please refer to FIG. 2, which illustrates a combination schematic drawing of the battery ejecting structure according to the first embodiment of the present invention. As shown in FIG. 2, after combining the battery ejecting structure 1 of the present invention, the pushing element 30 allows the locking structure 31 to lock the battery 120; meanwhile, the elastic element 40 is in a tension state.

Figure 3:
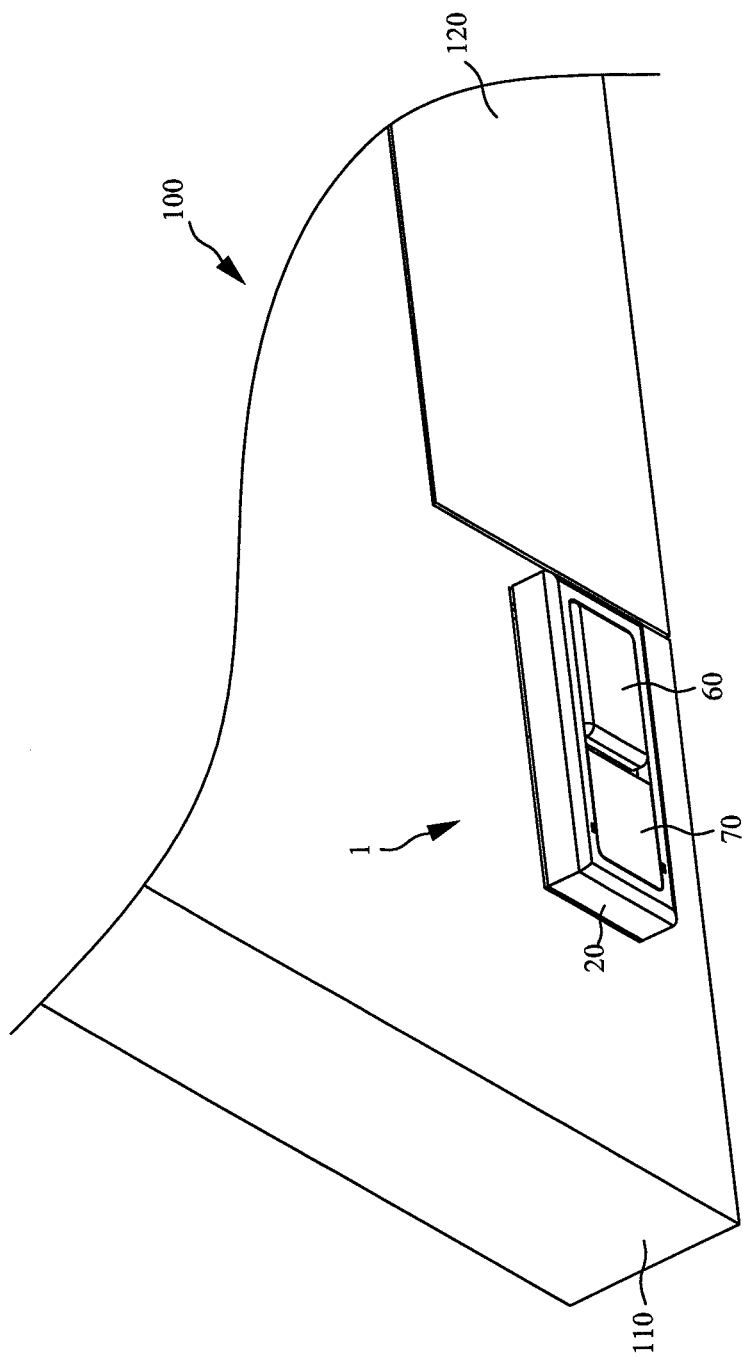
FIG. 3 illustrates a schematic drawing of the battery ejecting structure while the cover is in the closed state according to the first embodiment of the present invention.
Figure 4:
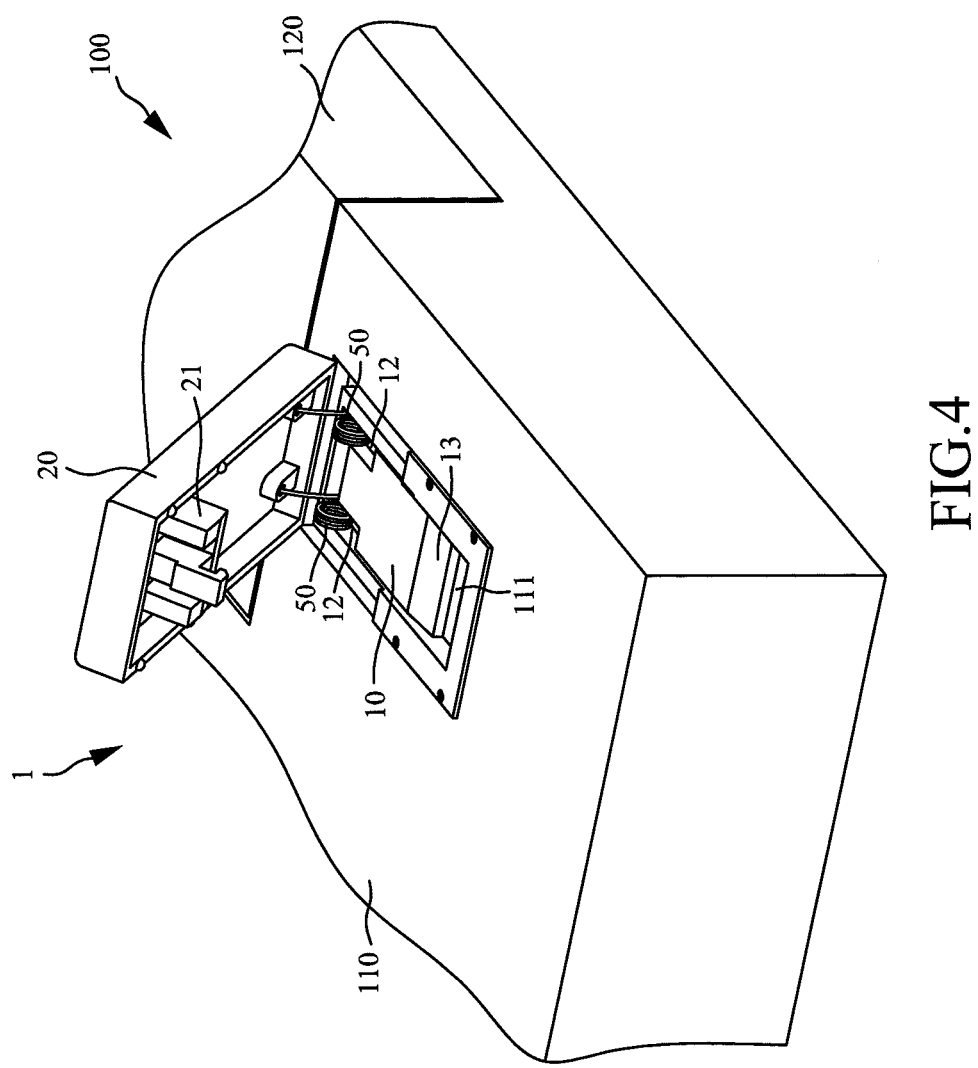
FIG. 4 illustrates a schematic drawing of the battery ejecting structure while the cover is in the open state according to the first embodiment of the present invention.

Please refer to FIGS. 3 and 4. FIG. 3 illustrates a schematic drawing of the battery ejecting structure while the cover is in the closed state according to the first embodiment of the present invention, and FIG. 4 illustrates a schematic drawing of the battery ejecting structure while the cover is in the open state according to the first embodiment of the present invention.

As shown in FIG. 3 and FIG. 4, the cover 20 of the battery ejecting structure 1 of the present invention may totally cover the container 111 in the closed state, and the ejecting element 10 may be moved along the container 111 in the open state. The ejecting element 10 further comprises an incline structure 13 used for providing a linkage effect with the blocking element 21 during the closing process of the cover 20. In order to work with the at least one torsion spring 50, the ejecting element 10 further comprises at least one recess 12, for example, in this embodiment, there are two recesses 12 corresponding to two torsion spring 50 in the ejecting element 10. The position of each recess 12 corresponds to each torsion spring 50 to avoid that the torsion spring 50 limits or blocks the movement of the ejecting element 10.

The battery ejecting structure 1 in one embodiment of the present invention further comprises a pad 60 located on an external surface of the cover 20. In this embodiment, the cover 20 and the pad 60 are formed by a co-injection molding method to be integral with plastic materials (such as plastic) and elastic materials (such as rubber); wherein the cover 20 is made of plastic materials to provide stable structure in order to facilitate users to operator; and the pad 60 is made of elastic materials to provide buffering and increase the height for the portable electronic device. However, the present invention is not limited to this embodiment, the cover 20 and pad 60 may be made of other materials respectively, then combined.

As shown in FIG. 1 and FIG. 3, the battery ejecting structure 1 in one embodiment of the present invention further comprises a support element 70 connected pivotally to the housing 20, and the support element 70 is used for providing a better supporting to increase the height while it forms a support state. In this embodiment, the support element 70 is located next to the pad 60, but the present invention is not limited to the design. The support element 70 is substantially parallel to the cover 20 and received in the cover 20 in a receiving state.

Figure 5:
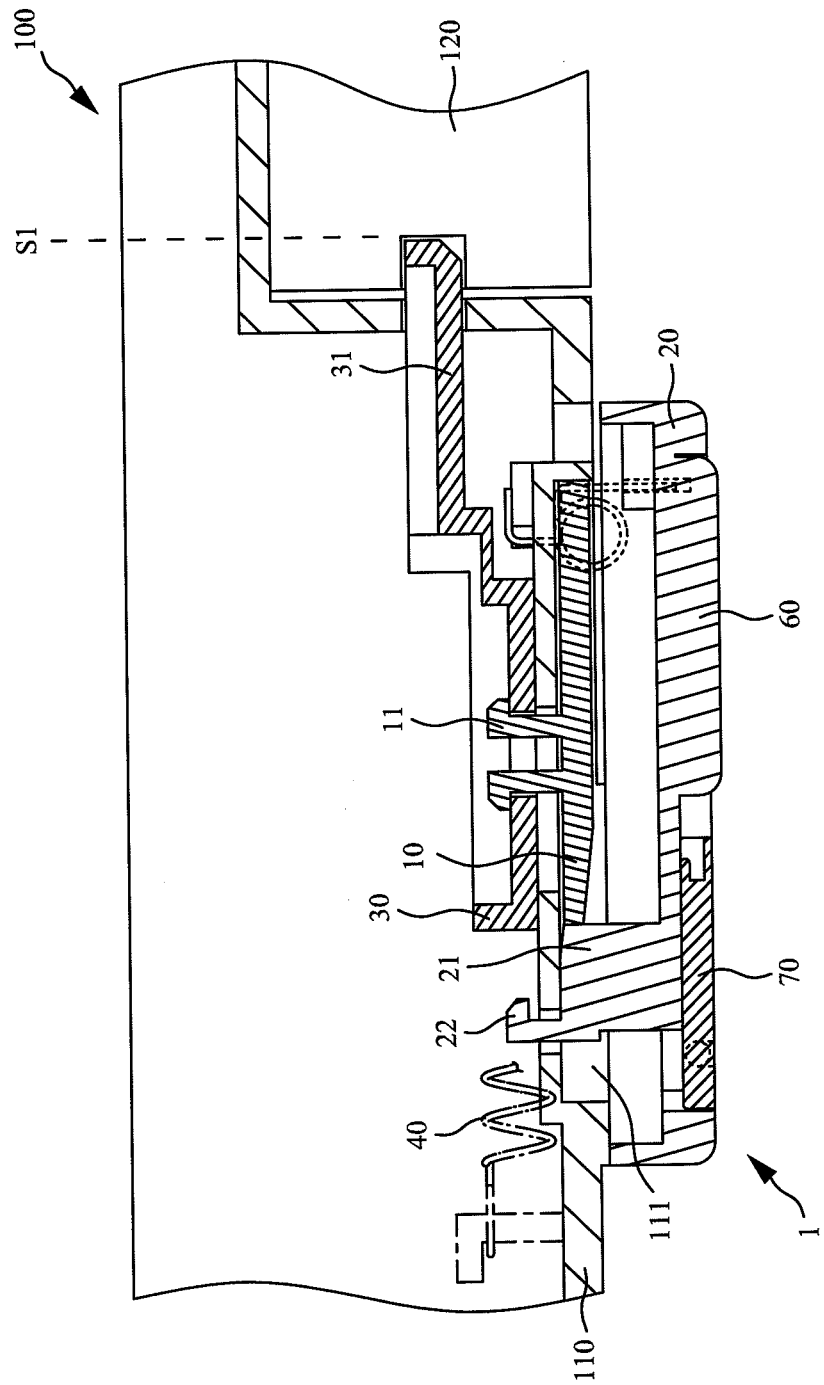
FIG. 5 illustrates a cross-sectional drawing of the battery ejecting structure along a line A-A' in FIG. 2 while the cover is in the closed state according to the first embodiment of the present invention.
Figure 6:
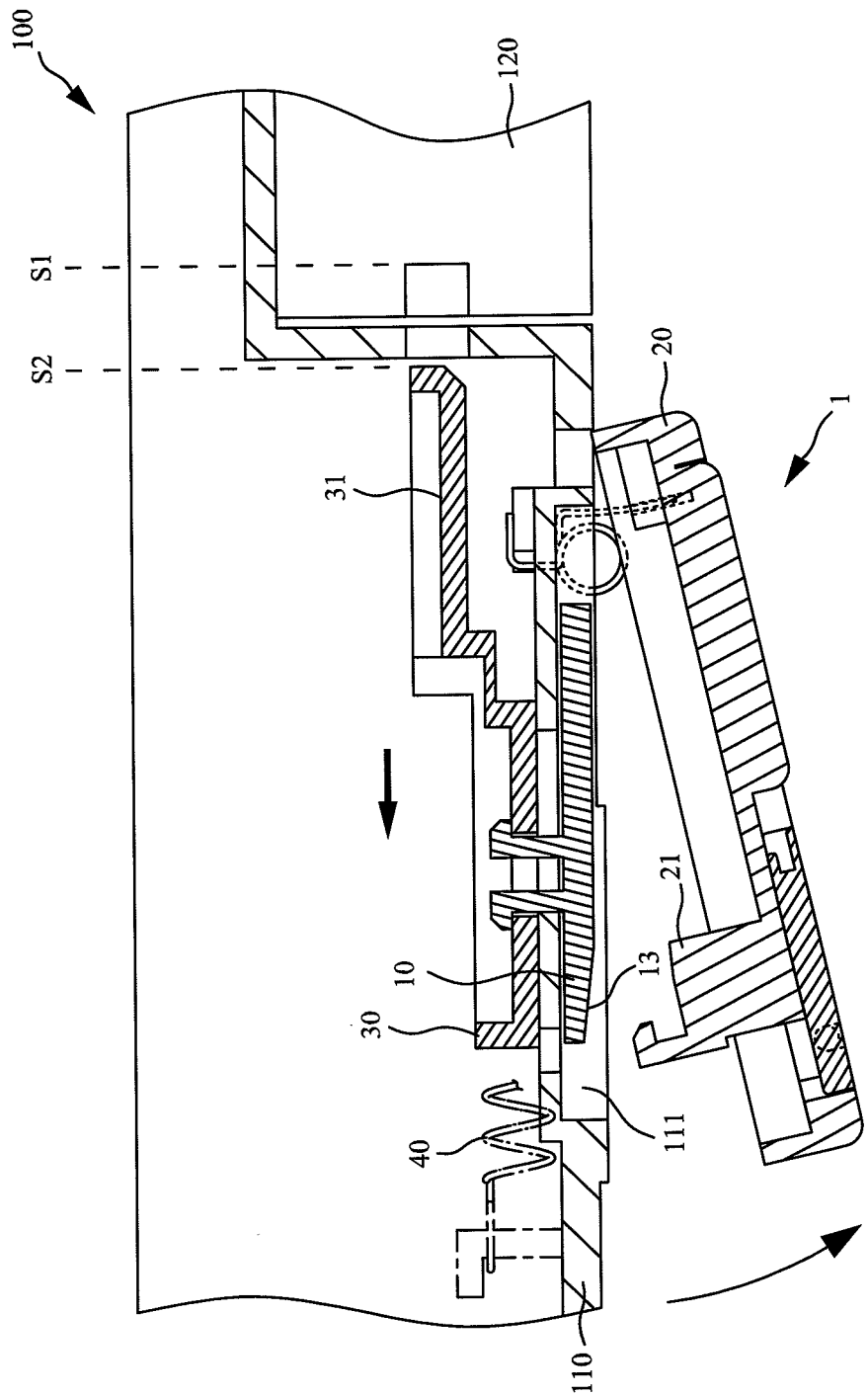
FIG. 6 illustrates a cross-sectional drawing of the battery ejecting structure along a line A-A' in FIG. 2 while the cover is in the open state according to the first embodiment of the present invention.

Please refer to FIG. 5 and FIG. 6. FIG. 5 illustrates a cross-sectional drawing of the battery ejecting structure along a line A-A' in FIG. 2 while the cover is in the closed state according to the first embodiment of the present invention. FIG. 6 illustrates a cross-sectional drawing of the battery ejecting structure along a line A-A' in FIG. 2 while the cover is in the open state according to the first embodiment of the present invention.

As shown in FIG. 5, while the cover 20 of the battery ejecting structure 1 is in the closed state, the cover 20 is fastened to the housing 110 via the fastening structure 22, and restricts the movement of the ejecting element 10 via the blocking element 21. The pushing element 30 is in an initial position S1 to lock the battery 120 via the locking structure 31. In the state, the cover 20 may be taken as the foot pad of the portable electronic device 100 to provide buffering and increase the height via the pad 60.

As shown in FIG. 6, while a user opens the cover 20 to form the open state, the blocking element 21 may follow the cover 20 to be disengaged from the container 111. Then the ejecting element 10 is pulled to move along the direction of the arrow by the elastic restoring force of an elastic element 40 in the tension state, and the pushing element 30 is moved from the initial position S1 to an unlock position S2, such that the locking structure 31 unlocks the battery 120. Therefore, the user may take the battery 120 away from the housing 110 easily.

Conversely, after a user puts the battery 120 into the housing 110, the cover 20 is closed from the open state towards the housing 110, and the blocking element 21 pushes the incline structure 13 to move the ejecting element 10; then the pushing element 30 is returned to the initial position S1 from the unlock position S2, such that the locking structure 31 locks the battery 120 again. Finally, the cover 20 returns to be in the closed state and is fastened to the housing 110, and the elastic element 40 returns to the torsion state.

Figure 7:
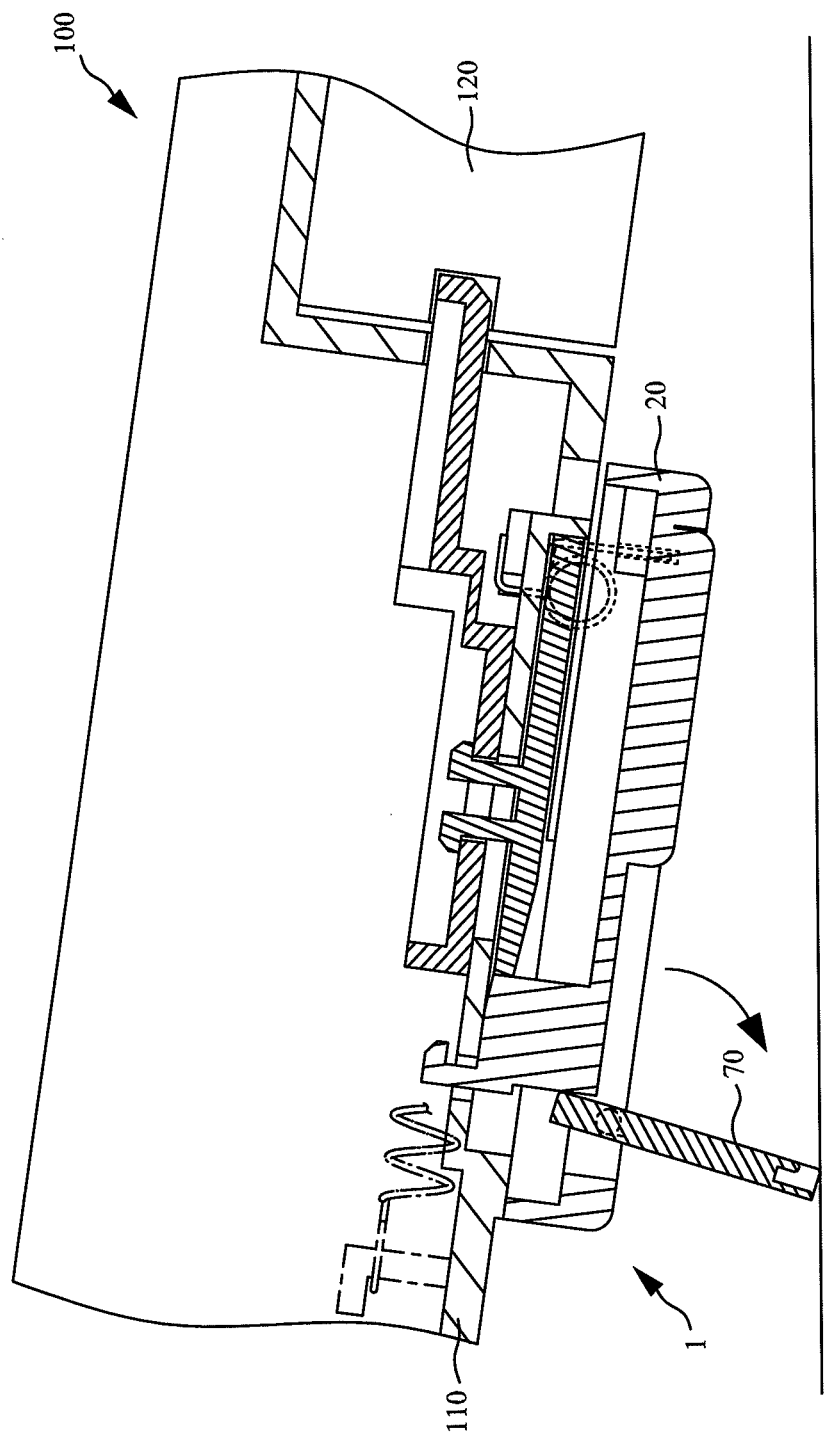
FIG. 7 illustrates a schematic drawing of the working condition of the support element of the battery ejecting structure according to the first embodiment of the present invention.

Please refer to FIG. 5 and FIG. 7. FIG. 7 illustrates a schematic drawing of the working condition of the support element of the battery ejecting structure according to the first embodiment of the present invention. As shown in FIG. 5, while the support element 70 is in the received state, it is received in the cover 20; to use the support element 70, user may pull the support element 70, such that the support element 70 rotates relative to the cover 20 and presents an angle with the surface of the cover 20 to form the support state. Meanwhile, the support element 70 in support state increases the distance between the portable electronic device 100 and a placed plane, such that the heat dissipation space increases. If the support element 70 is unnecessary to use, user may just push the support element 70 to be received in the cover 20.

Therefore, the battery ejecting structure 1 of the present invention may control to lock or unlock the battery 120 via operating the cover 20, and the cover 20 may be the foot pad to reduce device elements.

Furthermore, the portable electronic device 100 of the present invention comprises the housing 110, the battery 120 and the above battery ejecting structure 1. The housing 110 comprises a container 111, to locate the battery ejecting structure 1 thereof; the battery 120 is located in the housing 110 next to the container 111 to allow the battery ejecting structure 1 to lock or unlock the battery 120. The structures and operating method are like the above description of the battery ejecting structure 1, so there is no need for further description.

Figure 8:
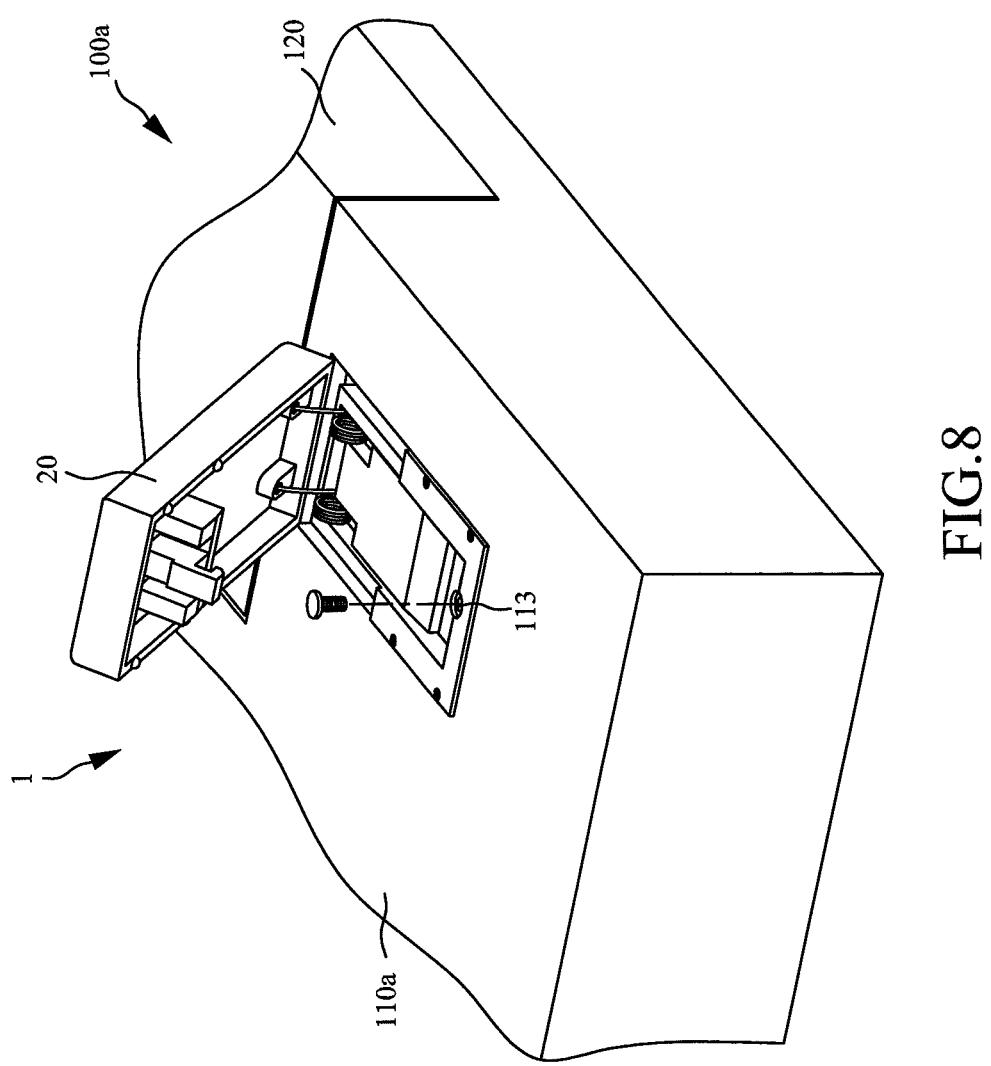
FIG. 8 illustrates a partial schematic drawing of the portable electronic device according to one embodiment of the present invention.

Please refer the FIG. 8, which illustrates a partial schematic drawing of the portable electronic device according to one embodiment of the present invention. As shown in FIG. 8, in one embodiment of the present invention of the portable electronic device 100a, the housing 110a comprises the screw hole 113, and the battery ejecting structure 1 is located correspondingly to the position of the screw hole 113, such that the cover 20 may cover the screw hole 113 in the closed state. Therefore, the screw hole 113 is hidden by the cover 20, and user may not see the screw hole 113 directly, such that the portable electronic device 100a of the present invention looks more beautiful.

Furthermore, the portable electronic device 100 may depend on different design or request to add the container 111 and the battery ejecting structure 1 with foot pad function, and not limited to above embodiments.

Although the present invention has been explained in relation to its preferred embodiments, it is to be understood that many other possible modifications and variations can be made without departing from the spirit and scope of the invention as hereinafter claimed.

What is claimed is:

1. A battery ejecting structure applied to a portable electronic device, the portable electronic device comprising a housing and a battery, the battery ejecting structure comprising:
   an ejecting element, located movably in a container of the housing, the ejecting element comprising a fixed member;
   a cover, connected pivotally to the housing and covering the container to be a closed state, the cover comprising a blocking element for restricting the ejecting element to move in the closed state;
   a pushing element, located in the housing, the fixed member of the ejecting element being connected to the pushing element through the housing, the pushing element comprising a locking structure for locking the battery while the pushing element being in an initial position; and
   an elastic element, two ends of the elastic element connected to the housing and the pushing element respectively;
   wherein when the cover is rotated relative to the housing to form an open state, the blocking element disengages from the container, and the pushing element is moved from the initial position to an unlock position by an elastic restoring force of the elastic element to unlock the battery.

2. The battery ejecting structure as claimed in claim 1, further comprising a pad located on an external surface of the cover.

3. The battery ejecting structure as claimed in claim 2, wherein the cover and the pad are formed by a co-injection molding method to be integral, the cover is made of a plastic material, and the pad is made of an elastic material.

4. The battery ejecting structure as claimed in claim 1, further comprising a support element connected pivotally to the cover, the support element being substantially parallel to the cover and received in the cover in a receiving state; wherein the support element presents an angle with the surface of the cover when the support element is rotated relative to the cover to form a support state.

5. The battery ejecting structure as claimed in claim 1, wherein the cover is connected pivotally to the housing by at least one torsion spring, and the cover automatically returns to the closed state from the open state via the at least one torsion spring.

6. The battery ejecting structure as claimed in claim 5, wherein the ejecting element further comprises an at least one recess, each recess is located corresponding to each torsion spring to avoid that the torsion spring limits the movement of the ejecting element.

7. The battery ejecting structure as claimed in claim 1, wherein the ejecting element further comprises an incline structure, during a process for the cover returning to the closed state from the open state, the pushing element is returned to the initial position from the unlock position by the blocking element pushing the incline structure.

8. The battery ejecting structure as claimed in claim 1, wherein the cover further comprises a fastening structure for fastening the cover to the housing while the cover is in the closed state.

9. A portable electronic device comprising:
   a housing comprising a container;
   a battery, located in the housing; and
   a battery ejecting structure comprising:
      an ejecting element, located movably in the container, the ejecting element comprising a fixed member;
      a cover, connected pivotally to the housing and covering the container to be a closed state, the cover comprising a block element for restricting the ejecting element to move in the closed state;
      a pushing element, located in the housing, the fixed member of the ejecting element being connected to the pushing element through the housing, the pushing element comprising a locking structure for locking the battery while the pushing element being in an initial position; and
      an elastic element, two ends of the elastic element connected to the housing and the pushing element respectively;
      wherein when the cover is rotated relative to the housing to form an open state, the blocking element disengages from the container, and the pushing element is moved from the initial position to an unlock position by an elastic restoring force of the elastic element to unlock the battery.

10. The portable electronic device as claimed in claim 9, further comprising a pad located on an external surface of the cover.

11. The portable electronic device as claimed in claim 10, wherein the cover and the pad are formed by a co-injection molding method to be integral, the cover is made of a plastic material, and the pad is made of an elastic material.

12. The portable electronic device as claimed in claim 9, wherein the cover further comprises a support element connected pivotally to the cover, the support element is substantially parallel to the cover and received in the cover in a receiving state; and the support element presents an angle with the surface of the cover when the support element is rotated relative to the cover to form a support state.

13. The portable electronic device as claimed in claim 9, wherein the cover is connected pivotally to the housing by at least one torsion spring, and the cover automatically returns to the closed state from the open state via the at least one torsion spring.

14. The portable electronic device as claimed in claim 13, wherein the ejecting element further comprises an at least one recess, each recess is located corresponding to each torsion spring to avoid that the torsion spring limits the movement of the ejecting element.

15. The portable electronic device as claimed in claim 9, wherein the ejecting element further comprises an incline structure, during a process for the cover returning to the closed state from the open state, the pushing element is returned to the initial position from the unlock position by the blocking element pushing the incline structure.

16. The portable electronic device as claimed in claim 9, wherein the cover further comprises a fastening structure for fastening the cover to the housing while the cover is in the closed state.

17. The portable electronic device as claimed in claim 9, wherein the container comprises a slide hole, the fixed member is connected to the pushing element through the slide hole.

18. The portable electronic device as claimed in claim 9, wherein the housing comprises a screw hole, the cover covers the screw hole in the closed state.

* * * * *